(12) United States Patent
Jass et al.

(10) Patent No.: US 12,299,702 B2
(45) Date of Patent: May 13, 2025

(54) SYSTEMS AND METHODS FOR COMPUTER ANALYTICS OF ASSOCIATIONS BETWEEN ONLINE AND OFFLINE PURCHASE EVENTS

(71) Applicant: Worldpay, LLC, Symmes Township, OH (US)

(72) Inventors: Nicole Jass, Aurora, CO (US); Dennis A. Kettler, Lebanon, OH (US)

(73) Assignee: Worldpay, LLC, Symmes Township, OH (US)

( * ) Notice: Subject to any disclaimer, the term of this patent is extended or adjusted under 35 U.S.C. 154(b) by 0 days.

(21) Appl. No.: 17/849,128

(22) Filed: Jun. 24, 2022

(65) Prior Publication Data
US 2022/0327559 A1  Oct. 13, 2022

Related U.S. Application Data

(63) Continuation of application No. 17/104,480, filed on Nov. 25, 2020, now Pat. No. 11,403,650, which is a
(Continued)

(51) Int. Cl.
*G06Q 30/0201* (2023.01)
*G06Q 30/0601* (2023.01)

(52) U.S. Cl.
CPC ..... *G06Q 30/0201* (2013.01); *G06Q 30/0633* (2013.01)

(58) Field of Classification Search
None
See application file for complete search history.

(56) References Cited

U.S. PATENT DOCUMENTS 9,569,760 B2 * 2/2017 Deutscher ............ G06Q 20/127
10,977,701 B2 * 4/2021 Crutchfield, Jr. .. G06Q 30/0641
(Continued)

FOREIGN PATENT DOCUMENTS

| EP | 3164841 A4 * | 12/2017 | ......... G06Q 20/3223 |
| WO | WO-2014210227 A1 * | 12/2014 | ........... G06Q 20/363 |
| WO | WO-2017201231 A1 * | 11/2017 | ......... G06Q 30/0241 |

OTHER PUBLICATIONS

Tewari, Anand Shanker, Abhay Kumar, and Asim Gopal Barman. "Book recommendation system based on combine features of content based filtering, collaborative filtering and association rule mining." 2014 IEEE International Advance Computing Conference (IACC). IEEE, 2014. (Year: 2014).*
(Continued)

*Primary Examiner* — Thomas L Mansfield
(74) *Attorney, Agent, or Firm* — Bookoff McAndrews, PLLC

(57) ABSTRACT

Systems and methods are disclosed for generating consumer analytics for products placed in online shopping carts. A profiler computing system generates a unique tacking profile for associating purchase events by a purchaser. Payment vehicle data and a tracking element are associated with the identified purchaser profile. The purchaser profile may be generated based on purchase information associated with an initial purchase event by the purchaser. The profiler computing system determines whether products abandoned in online shopping carts are purchased at brick-and-mortar affiliates or other merchant forums. Other embodiments are described and claimed.

14 Claims, 9 Drawing Sheets

Related U.S. Application Data continuation of application No. 16/805,048, filed on Feb. 28, 2020, now Pat. No. 10,902,440, which is a continuation of application No. 15/367,992, filed on Dec. 2, 2016, now Pat. No. 10,621,599.

(56) References Cited

U.S. PATENT DOCUMENTS

| | | | | |
|---|---|---|---|---|
| 2006/0265406 | A1* | 11/2006 | Chkodrov | G06Q 20/4016 |
| 2012/0166268 | A1* | 6/2012 | Griffiths | G06Q 30/0222 |
| | | | | 705/14.23 |
| 2013/0173426 | A1 | 7/2013 | Deutscher | |
| 2013/0205220 | A1* | 8/2013 | Yerli | H04L 67/75 |
| | | | | 715/748 |
| 2013/0332273 | A1* | 12/2013 | Gu | G01S 5/0027 |
| | | | | 701/428 |
| 2014/0365336 | A1* | 12/2014 | Hurewitz | G06Q 30/0625 |
| | | | | 705/26.62 |
| 2015/0112826 | A1 | 4/2015 | Crutchfield, Jr. | |
| 2015/0112836 | A1* | 4/2015 | Godsey | G06Q 30/0613 |
| | | | | 705/26.41 |
| 2015/0154674 | A1* | 6/2015 | Todasco | G06Q 30/0631 |
| | | | | 705/26.7 |
| 2015/0154675 | A1* | 6/2015 | Todasco | G06Q 30/0631 |
| | | | | 705/26.7 |
| 2015/0278888 | A1 | 10/2015 | Lu | |
| 2016/0005038 | A1* | 1/2016 | Kamal | G06Q 20/3223 |
| | | | | 705/44 |
| 2016/0140645 | A1* | 5/2016 | Whang | G06Q 20/36 |
| | | | | 705/26.8 |

OTHER PUBLICATIONS

Jai, Tun-Min Catherine, Leslie Davis Burns, and Nancy J. King. "The effect of behavioral tracking practices on consumers' shopping evaluations and repurchase intention toward trusted online retailers." Computers in Human Behavior 29.3 (2013): 901-909. (Year: 2013).*

Pauwels, Koen, et al. "Does online information drive offline revenues?: Only for specific products and consumer segments!." Journal of retailing 87.1 (2011): 1-17. (Year: 2011).*

Shangguan, Longfei, et al. "ShopMiner: Mining customer shopping behavior in physical clothing stores with COTS RFID devices." Proceedings of the 13th ACM conference on embedded networked sensor systems. 2015. (Year: 2015).*

Marquardt, Philip, David Dagon, and Patrick Traynor. "Impeding individual user profiling in shopper loyalty programs." Financial Cryptography and Data Security: 15th International Conference, FC 2011, Gros Islet, St. Lucia, Feb. 28-Mar. 4, 2011, Springer Berlin Heidelbe (Year: 2011).*

Xu, Yin, et al., "Factors Influencing Cart Abandonment in the Online Shopping Process." Social Behavior and Personality: An International Journal, 43.10 (2015): 1617-1627, Year: 2015.

Kukar-Kinney, et al., "The Determinants of Consumers' Online Shopping Cart Abandonment." Jouarnal of the Academy of Marketing Science 38.2 (2010): 240-250, Year: 2010.

* cited by examiner

SYSTEMS AND METHODS FOR COMPUTER ANALYTICS OF ASSOCIATIONS BETWEEN ONLINE AND OFFLINE PURCHASE EVENTS

CROSS-REFERENCE TO RELATED APPLICATION(S)

This patent application is a continuation of and claims the benefit of priority to U.S. application Ser. No. 17/104,480, filed Nov. 25, 2020, which is a continuation of U.S. application Ser. No. 16/805,048, filed Feb. 28, 2020, now U.S. U.S. Pat. No. 10,902,440, which is a continuation of and claims the benefit of priority to U.S. application Ser. No. 15/367,992, filed on Dec. 2, 2016, now U.S. Pat. No. 10,621,599, all of which are incorporated herein by reference in their entireties.

TECHNICAL FIELD

The present disclosure relates generally to the field of e-commerce transactions and, more particularly, to technology that generates consumer analytics for products placed in online shopping carts.

BACKGROUND

Online merchants have virtual shopping carts in which consumers place products prior to making a purchase. In some cases, online merchants may be negatively impacted when consumers place items in online shopping carts, but then leave before completing a purchase. This increasing trend of product "abandonment" in online shopping carts translates to a significant loss of business opportunity. Without adequate tracking analytics, additional marketing investments are potentially wasted when advertising assets are directed to consumers who may have otherwise purchased the products elsewhere.

SUMMARY

A computer-implemented method is disclosed for generating consumer analytics for products placed in online shopping carts. The method comprises receiving an indication of a product placed by a purchaser in an online shopping cart associated with a first online merchant; identifying a unique tracking identifier associated with the purchaser; starting a timer after detecting the product placement in the online shopping cart; detecting whether the purchaser completed a purchase transaction of the product placed in the online shopping cart, wherein if an indication is received that the purchaser completed a purchase transaction of the product placed in the online shopping cart, then: stopping the timer; calculating a time accrual measuring between starting the timer and stopping the timer; characterizing the purchase transaction as a conversion; appending the unique tracking identifier to include the time accrual and conversion information; and reporting the time accrual and conversion information to a receiving entity.

A system is disclosed for generating consumer analytics for products placed in online shopping carts, the system comprising: a data storage device storing instructions for generating consumer analytics for products placed in online shopping carts; and a processor configured to execute the instructions to perform a method including the steps of: receiving an indication of a product placed by a purchaser in an online shopping cart associated with a first online merchant; identifying a unique tracking identifier associated with the purchaser; starting a timer after detecting the product placement in the online shopping cart; detecting whether the purchaser completed a purchase transaction of the product placed in the online shopping cart, wherein if an indication is received that the purchaser completed a purchase transaction of the product placed in the online shopping cart, then: stopping the timer; calculating a time accrual measuring between starting the timer and stopping the timer; characterizing the purchase transaction as a conversion; appending the unique tracking identifier to include the time accrual and conversion information; and reporting the time accrual and conversion information to a receiving entity.

A non-transitory computer readable medium is disclosed for use on at least one computer system containing computer-executable programming instructions for generating consumer analytics for products placed in online shopping carts, the method comprising: receiving an indication of a product placed by a purchaser in an online shopping cart associated with a first online merchant; identifying a unique tracking identifier associated with the purchaser; starting a timer after detecting the product placement in the online shopping cart; detecting whether the purchaser completed a purchase transaction of the product placed in the online shopping cart, wherein if an indication is received that the purchaser completed a purchase transaction of the product placed in the online shopping cart, then: stopping the timer; calculating a time accrual measuring between starting the timer and stopping the timer; characterizing the purchase transaction as a conversion; appending the unique tracking identifier to include the time accrual and conversion information; and reporting the time accrual and conversion information to a receiving entity.

It is to be understood that both the foregoing general description and the following detailed description are exemplary and explanatory only and are not restrictive of the detailed embodiments, as claimed.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

DETAILED DESCRIPTION

Figures 1A, 1B, 1C, 1D:
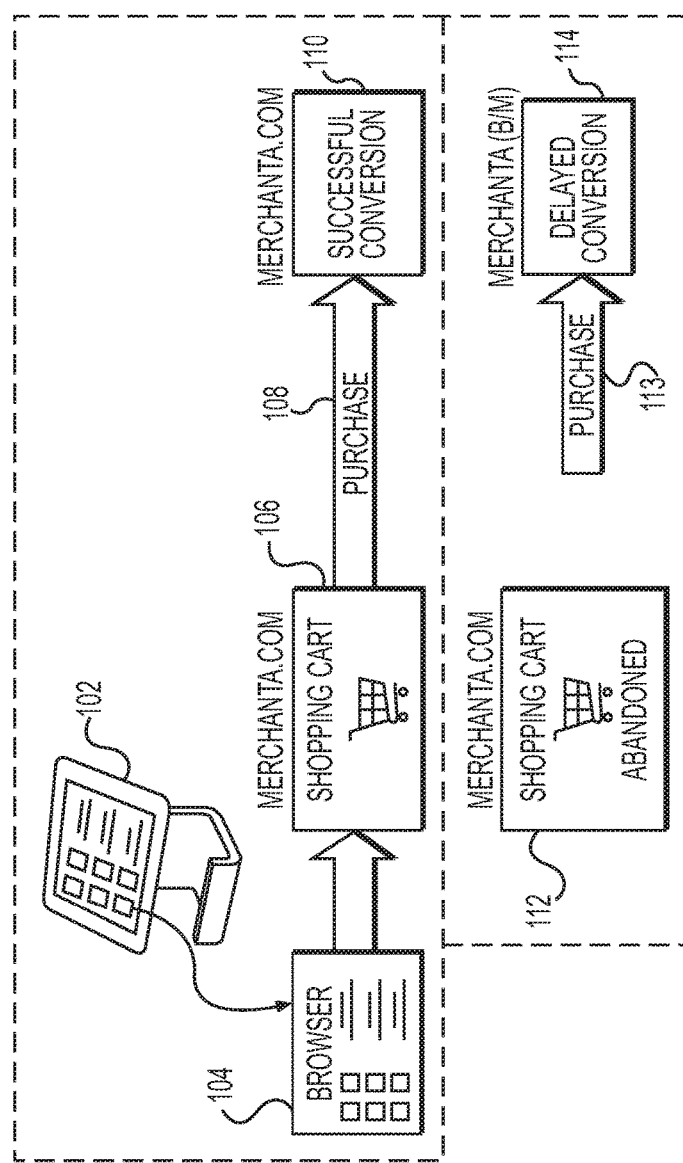
FIGS. 1A-1D depict various scenarios in which a consumer completes a purchase transaction or abandons a product in an online shopping cart, according to one or more embodiments.

Various non-limiting embodiments of the present disclosure will now be described to provide an overall understanding of the principles of the structure, function, and use of systems and methods disclosed herein related to the generation of consumer analytics for products placed in online shopping carts. One or more examples of these non-limiting embodiments are illustrated in the selected examples disclosed and described in detail with reference made to FIGS. 1A through 5 in the accompanying drawings. Those of ordinary skill in the art will understand that systems, apparatuses, devices, and methods specifically described herein and illustrated in the accompanying drawings are non-limiting embodiments. The features illustrated or described in connection with one non-limiting embodiment may be combined with the features of other non-limiting environments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these apparatuses, devices, systems or methods unless specifically designated as mandatory. For ease of reading and clarity, certain components, modules, or methods may be described solely in connection with a specific figure. In this disclosure, any identification of specific techniques, arrangements, etc. either are related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. may be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures, or characteristics may be combined in any suitable manner in one or more embodiments.

Throughout this disclosure, references to components or modules generally refer to items that logically may be grouped together to perform a function or group of related functions. Like reference numerals are generally intended to refer to the same or similar components. Components and modules may be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack.

Many companies utilize a variety of different marketing campaigns to attract new business, increase revenue, or serve other business needs. Many companies engage in advertising through multiple marketing channels, such as TV, radio, Internet, and so forth. With specific regard to Internet-based marketing, it is often difficult for these companies to correlate advertising and marketing expenditures to subsequent purchase events, especially when those purchase events occur through different sales channels or occur subsequent to a consumer's initial exposure to marketing communications. By way of example, a typical consumer may spend time visiting or otherwise interacting with a merchant's website to research a particular good and/or service, referred to herein as a "product." The consumer may arrive at the merchant's website through "clicking through" an advertisement appearing on a web page, or within a mobile application, through keyword searching, or through other means. The consumer may decide to buy the product through the merchant's e-commerce portal during that visit to the merchant's website. A consumer places a product in a virtual shopping cart and completes a purchase transaction. Such purchase events are generally traceable by the merchant, or an affiliated entity, such that a correlation between the consumer's online activity and the purchase event may be tracked and identified as a successful "conversion." However, in other instances, instead of purchasing the product in an online transaction, the consumer may abandon the product in the online shopping cart and physically travel to a brick-and-mortal retail location of the merchant to purchase the product. In this instance, the purchase event may be identified as a "delayed conversion." Without adequate tracking analytics, the online merchant would see the abandoned product as a lost sale.

Using presently available consumer tracking data, there may be a disconnect between the consumer's online activity and their subsequent purchases at the brick-and-mortar retail location. Nevertheless, it may be desirable for the merchant, or other interested parties, to understand any correlation that exists between the consumer's previous exposure to the merchant's website, or other online activities, and the subsequent purchase of a product at the brick-and-mortar retail location.

In yet other instances, the consumer may decide to leave the merchant's website and then return to the merchant's website at a later point in time to make the purchase. If the consumer arrived at the website the first time by "clicking through" an online advertisement, but arrived at the website the second time through other means (e.g., keyword searching, direct URL input, etc.), the correlation between the two online sessions may not be known to a merchant. More particularly, due to techniques used for tracking online activity by marketers and other data aggregators, when the consumer returns to the website at a later point in time to make a purchase, the online advertisements with which the consumer previously interacted are not typically credited for driving the purchase event. Accordingly, it is desirable for merchants to know that a correlation exists between initial interaction with online advertisements and/or other online activities and the subsequent purchase of the product at an e-commerce website during a separate online session.

The presently disclosed system and methods are generally directed to providing a correlation and "linkages" between online activity of a consumer and subsequent purchase events by that consumer. The subsequent purchase events may occur at any type of merchant location, including online/e-commerce merchant locations and brick-and-mortar retail locations. The online activity may include exposure to marketing assets, advertisements, offers, coupons, website, as well as online searching, and so forth. Such online activity may be tracked and logged by a data aggregator computing system. In some embodiments, at least a portion of the data aggregator functionality is performed by a third party service. Additionally or alternatively, in some embodiments, at least a portion of the data aggregator functionality is performed by the merchant's web servers and/or servers that provide data aggregation services.

In accordance with the systems and methods described herein, a profile for the consumer may be generated and stored by a profiler computing system subsequent to the consumer making an online purchase. The online purchase may be made through interactions with a networked user device or computing device (e.g., laptop, a desktop computer, a smart appliance such as a smart television, a mobile phone, or any other mobile device, such as a tablet computer, and so forth). As described in more detail below, during the online purchase event, the purchaser may provide transaction data (e.g., purchase information) to a financial transaction services processor of a merchant, including payment vehicle information, over a network. Additionally, other information may be provided to the financial transaction services processor over the network during the course of the transaction and, in some embodiments, may be provided after the conclusion of the transaction. Such information may include a tracking element associated with the purchaser and/or a networked user device of the purchaser. For example, in some embodiments, the tracking element may be a device identifier of the networked user device of the purchaser. This device identifier may be used as part of the fraud prevention services of the financial transaction services processor or the payment networks (e.g., Visa® or MasterCard®). The device identifier may be, for example, one or more of a source IP address, a MAC address, a device ID, a device fingerprint, a browser fingerprint, a unique identifier, a cookie, an OS configuration, a static HTTP, or any other suitable type of identifier corresponding to the networked user device (e.g., computing device) of the purchaser. Additionally or alternatively, the tracking element may be an identifier associated with the purchaser. For example, in some embodiments, the tracking element may be embodied as, or otherwise include, a name, an email address, a primary account number (PAN), a postal address, a phone number, a loyalty account number, a username, a merchant-assigned user ID, browser and plug-in variables associated with consumer and consumer payment profiles, and/or any other unique identifier associated with the purchaser. Additionally, in accordance with the present disclosure, the financial transaction services processor may provide information from the online or initial purchase event to the profiler computing system.

As described in more detail below, the profiler computing system in accordance with the present disclosure may store a profile for the purchaser that generally links that tracking element (e.g., the device ID or purchaser ID) to the payment vehicle used by the purchaser during the online purchase event. In some embodiments, more than one tracking element may be linked to a particular purchaser. Furthermore, as is to be appreciated, in view of Payment Card Industry (PCI) requirements, various tokenization techniques may be used to mask personally identifiable information without departing from the scope of the present disclosure. In this regard, if the profiler computing system links a tracking element to a token, it is to be understood that the tracking element is still considered to be linked to the payment vehicle. The profile computer system may continue to augment the purchaser profile over time as additional online transactions are made by the purchaser. For example, if the purchaser initiates a second transaction from the same networked user device using a second payment vehicle, the second payment vehicle may be added to the purchaser's profile. In that way, the second payment vehicle may be linked to the tracking element.

The purchaser may then make a purchase at a merchant location (e.g., a brick-and-mortar retail location). Subsequently, a financial transactions services processor of the merchant may facilitate the communications with various payment networks (e.g., VISA® or MasterCard®), as may be needed, to complete the purchase event. For example, the purchaser may provide a payment vehicle to a point-of-sale (POS) system of the merchant. The POS can, in turn, communicate transactional information (e.g., subsequent purchase information) to the financial transaction services processor. The transactional information may typically include transaction amount, merchant identifier (MID), payment vehicle data, among other information. In accordance with the present disclosure, the financial transaction services processor may provide information from the subsequent purchase event to the profiler computing system. In one embodiment, payment vehicle information is provided to the profiler computing system so that the profiler computing system may determine if there is an affiliated (e.g., associated) profile. If there is a profile, the profiler computing system may determine the tracking element, or tracking elements, that are linked to that payment vehicle. As described above, in some embodiments, this linkage may be established during the purchaser's previous online purchases. Additionally or alternatively, the linkage may be established prior to the purchaser making an online purchase. For example, in some embodiments, the linkage may be established based at least in part on, or otherwise as a function of, payment vehicle information maintained in a purchaser's mobile wallet prior to making an online purchase. In any event, using the tracking element and the data collected by the data aggregator computing system, it may be determined if the purchase event at the merchant location (e.g., the brick-and-mortar retail location) may be attributed to any previous online activity of the purchaser and/or whether the purchased product was previously placed in a shopping cart of an online merchant. Such attribution and shopping cart correlation may be based on, for example, the transactional information provided to the financial transaction services processor by the POS. For example, in some embodiments, the attribution and shopping cart correlation may be based on the payment vehicle data and/or the MID provided to the financial transaction services processor by the POS.

Once attribution or shopping cart correlation has been determined, various types of reporting may be provided by the profiler computing system. Such reporting may generally attribute various online exposure events to subsequent purchase events. The reporting may be anonymized such that personal identifying information is not provided, but the effectiveness of various online marketing efforts may still be gleaned. Additionally, the reporting may segment or otherwise classify groups of purchasers, purchase events, online activities, or provide other divisions, as may be useful to a merchant, marketer, or other receiving entity. Based on this segmentation, targeted offers or other forms of marketing may be directed to particular groups of purchasers, such as purchasers that visit particular websites, purchasers who visit particular merchants, purchasers who use particular types of payment vehicles, purchasers who perform particular online searches, and so forth. Conversely, merchants may leverage purchase information to mitigate wasting of advertising assets for products that have already been purchased.

Accordingly, in view of the systems and methods described herein, and as describe in more detail below, a purchaser's purchasing activity may be attributed to the purchaser's previous online activity and/or correlated to a product left abandoned in an online shopping cart.

FIGS. 1A-1D schematically depict various scenarios in which a consumer has placed products into an online shopping basket, with subsequent purchase transactions leading to either a successful conversion, a delayed conversion, or a lost sale to a competitor. FIG. 1A depicts a scenario in which a purchase transaction results in a successful conversion. Computer 102 is shown with browser 104 in which a consumer may interact with e-commerce merchants for the purchase of products. While computer 102 is illustrated as a desktop computer, in may be appreciated that a consumer may interact with e-commerce merchants using other devices that connect to the Internet (e.g., tablets, mobile phones, and the like). After browsing through the online merchant's web portal (e.g., MerchantA.com), the consumer places a product in shopping cart 106 to make a purchase. The consumer provides MerchantA.com with their payment vehicle information to complete purchase 108 of the product placed in shopping cart 106, resulting in a successful conversion 110.

FIG. 1B depicts a scenario in which a consumer initially abandons a product in an online shopping cart but subsequently purchases the same product (whether similar or matching) at a brick-and-mortar affiliate of the online merchant. The matching product may be correlated to the product abandoned in the online shopping cart by using any non-limiting example of a matching characteristics, such as a product brand name, product weight, product dimension, product model number, product color, product size, manufacturer part number, stock keeping unit (SKU), international standard book number (ISBN), universal product code (UPC), international article number (EAN), or Global Trade Item Number (GTIN). Abandoned shopping cart 112 depicts the scenario in which a consumer places a product in the online shopping basket at MerchantA.com but does not follow through with the purchase at MerchantA.com. Instead, the consumer makes a purchase 113 of the same product at MerchantA (B/M), a brick-and-mortar (B/M) location or affiliate of MerchantA.com. While the product was left abandoned in abandoned shopping cart 112 of MerchantA.com, the purchase 113 of the same or matching product at the brick-and-mortar (B/M) affiliate results in a delayed but nevertheless "successful" conversion. The delayed conversion may include an added benefit to the merchant when the consumer purchases additional products while at the brick-and-mortar store.

FIG. 1C depicts a scenario in which the consumer places a product in an online shopping cart and later abandons it before purchasing it at a competitor's online forum. After browsing, the consumer leaves a product in abandoned shopping cart 112, but makes a purchase 115 at a competitor's online forum (e.g., MerchantB.com). In this scenario, purchase 115 would be characterized as a lost sale 116 for MerchantA.com. FIG. 1D similarly depicts a scenario in which the consumer leaves a product in abandoned shopping cart 112 at MerchantA.com, only to make a purchase 115 at a competitor's brick-and-mortar store (e.g., MerchantB (B/M)). The purchase 115 at MerchantB (B/M) would be characterized as a lost sale 116 for MerchantA.com. While purchase 115 may be characterized as a lost sale 116 to MerchantA.com, the purchase event data may be helpful to MerchantA in order to mitigate the waste of advertising assets for products that have already been purchased.

Figure 1E:
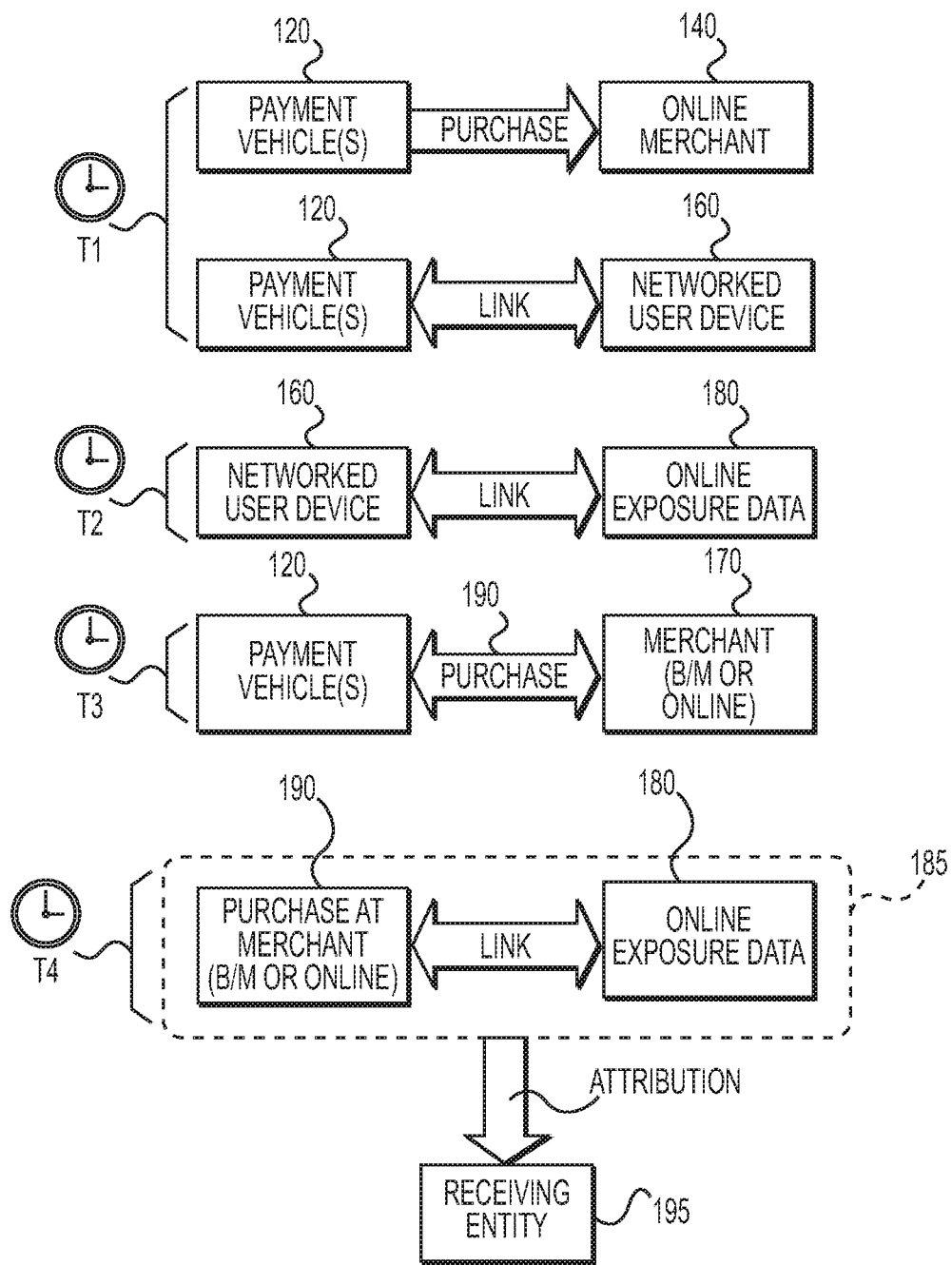
FIG. 1E depicts example linkages between payment vehicles, networked user devices, and online exposure data, according to one or more embodiments.

FIG. 1E schematically depicts the linkages that may be determined in accordance with the systems and methods described herein. As depicted by times T1-T4, such linkages may be developed over time, as the information becomes available. Additionally, while not shown, the linkages may also be updated over time, as the underlying data may become stale or inaccurate. Payment vehicle(s) 120 are first used by a purchaser to make a purchase at an online merchant 140. Such purchase may be made by network communications between a networked user device 160 or computing device of the purchaser and the online merchant 140 or through direct communications with the merchant's affiliated financial transaction services processor. In any event, a link may be established between the payment vehicle(s) 120 and the networked user device 160. Prior to, or subsequent to, the linking of the payment vehicle(s) 120 and the networked user device 160, the purchaser may be exposed to online exposure data 180 while interacting with the networked user device 160. Online exposure data 180 is not intended to be limited to any particular type of data, but rather broadly refers to the wide array of information that purchaser may see, enter, interact with, or otherwise encounter while engages in online activities. Examples of online exposure data 180 may include, without limitation, URLs visited, links that were clicked, keyword searches performed, online shopping baskets created, electronic advertisement interaction data, electronic marketing interaction data, and so forth. At a later point in time, the purchaser may make a purchase 190 at a merchant 170 using one of the payment vehicles 120. The merchant 170 may be any type of merchant, such as a brick-and-mortar retail location or an ecommerce/web-based merchant. Based on that purchase event, the purchase 190 at the merchant 170 may be linked or attributed to the online exposure data 180, as indicated by attribution 185. Such attribution may be based on, for example, satisfaction of various rules or guidelines for determining attribution. Such rules may include time frames, geographical restraints, and so forth. In one example, in order for a purchase 190 at a merchant 170 to be attributed to online exposure data 180, the purchaser must have had to encounter the online exposure data 180 within a certain time frame (e.g., less than 6 months, less than 3 month, less than 1 month, less than 1 week, and so forth). In this way, restrictive rules for determining attribution may lead to higher confidence levels in the attribution 185. The attribution 185 may ultimately be outputted or otherwise provided to a receiving entity 195. The receiving entity 195 may be, for example, the merchant 170, a data aggregator, a financial transaction services processor, a marketing entity, an analytics entity, or any other interested party.

Figure 2A:
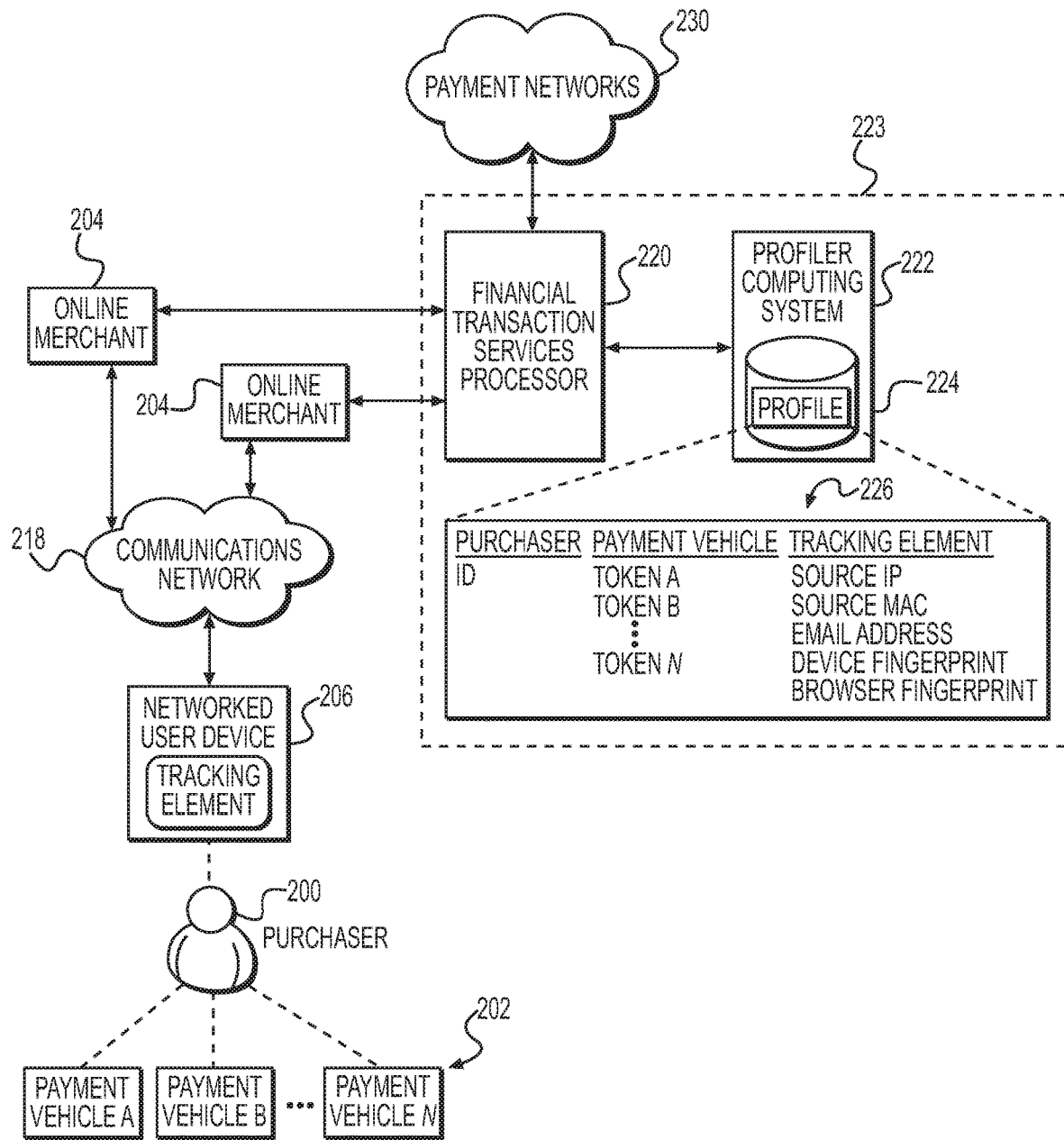
FIG. 2A depicts an example profile building system, according to one or more embodiments.
Figure 2B:
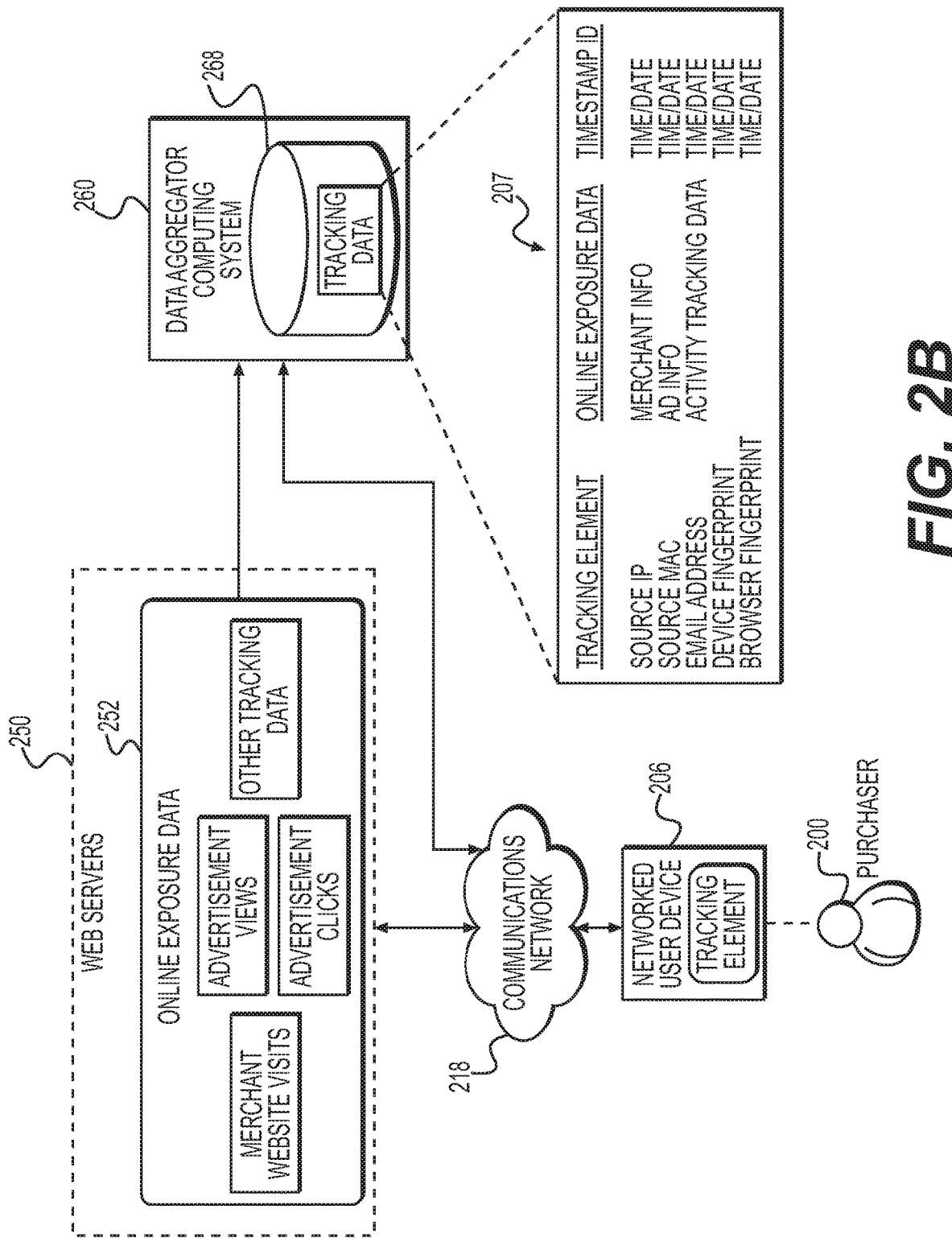
FIG. 2B depicts an example online tracking system, according to one or more embodiments.
Figure 2C:
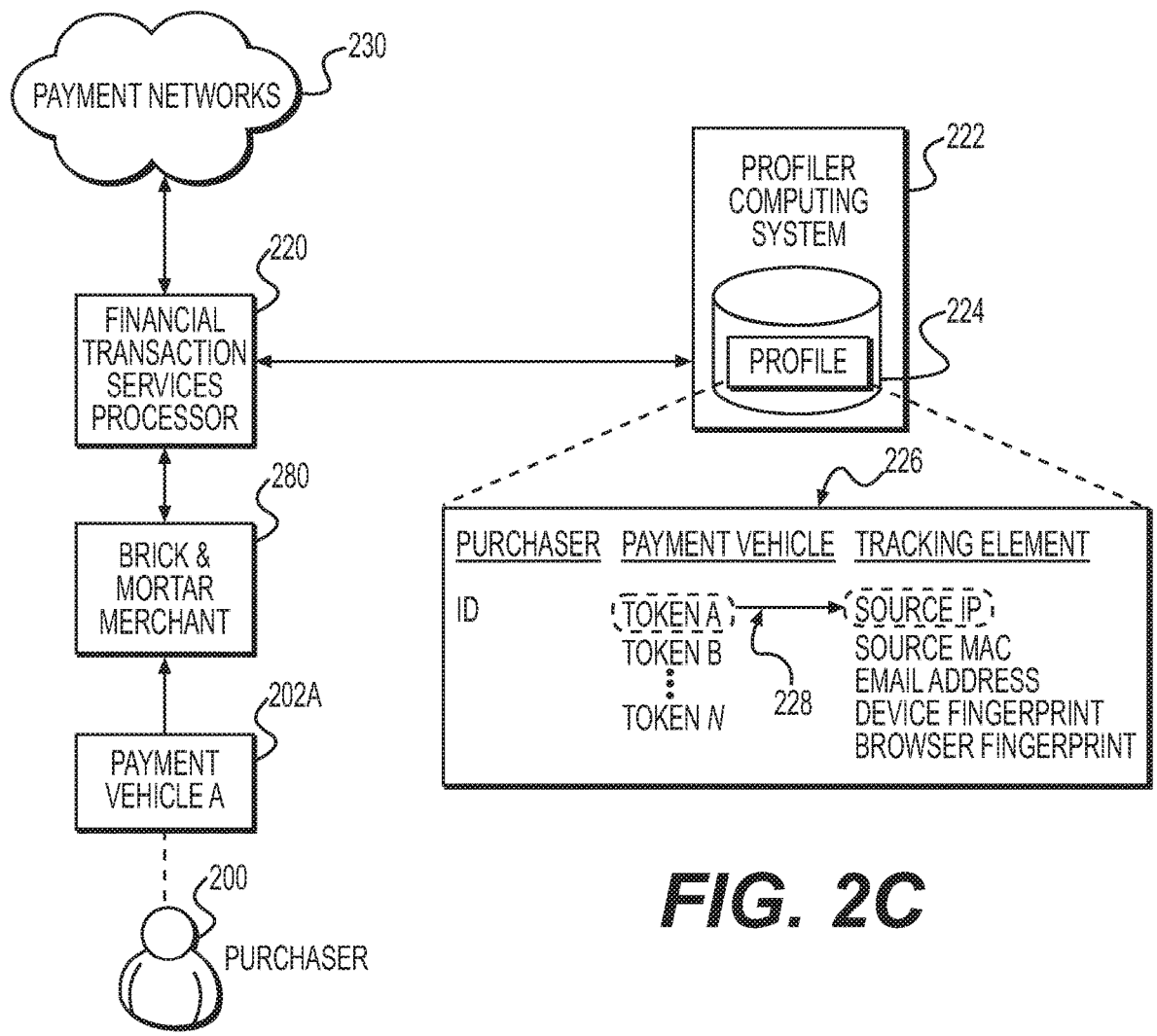
FIG. 2C depicts an example purchase tracking system, according to one or more embodiments.
Figure 2D:
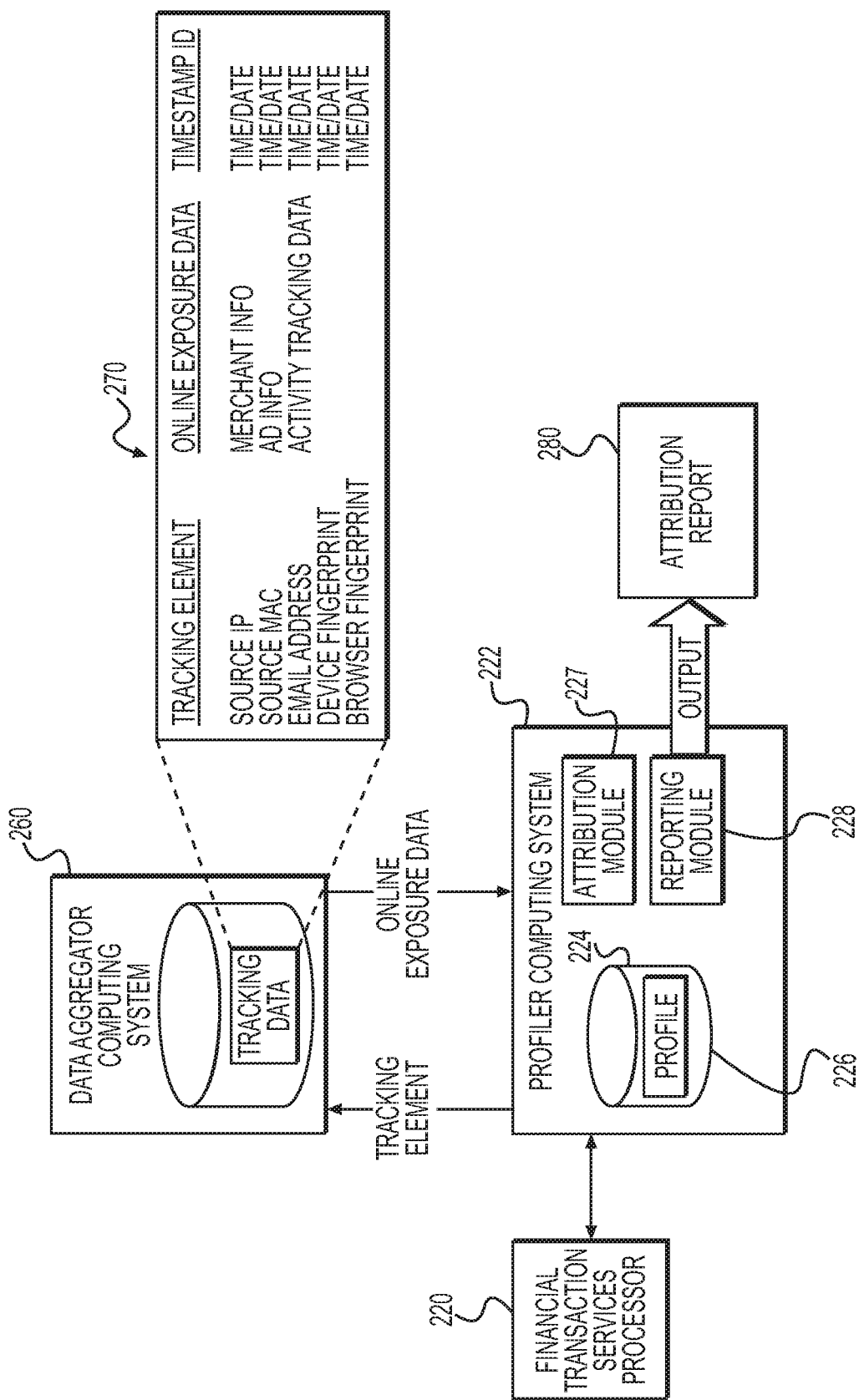
FIG. 2D depicts an example attribution diagram, according to one or more embodiments.

FIGS. 2A-2D depict example system diagrams in according with one non-limiting embodiment, with FIG. 2A schematically depicting profile building, FIG. 2B schematically depicting online tracking, FIG. 2C schematically depicting purchase tracking, and FIG. 2D schematically depicting attribution. Referring first to FIG. 2A, a purchaser 200 is shown that is associated with payment vehicles 202, which are depicted as Payment Vehicles A-N. As is to be appreciated, the payment vehicles 202 may include any type of payment vehicle that may be utilized to initiate a payment transaction. Unless otherwise specified herein, "payment vehicle" includes (1) a physical card including a plastic or paper card with a magnetic stripe, bar code or other indicator indicative of an account number or other account indicative information, and/or (2) a virtual card, such as a display or screenshot for a mobile phone or for another portable device (e.g., a flash drive, smart chip, a laptop or portable computer), or for a computer device (e.g., a desktop computer) in combination with data indicative of an account number or other account indicative information. Data associated with the cards may include an encrypted or unencrypted account number or other encrypted or unencrypted account indicative information and/or encrypted or unencrypted information associated with a particular card, issuer, creator, or group of merchants. It is also contemplated that the card may have multiple embodiments or forms. For example, the card may be a physical card (e.g., in the form of magnetic striped plastic card or an EMV card), a virtual card (e.g., in the form of a display on a smart phone), or both. In embodiments in which the card is a virtual card, the corresponding account information (e.g., account number) would initially be provided to the consumer and the consumer would communicate the account information to the merchant. The virtual card may be communicated by displaying a display or screenshot, and/or by transmitting a signal, such as by using NFC (Near Field Communication) technology or other secure transport technologies to complete the transaction with the selected merchant. Optionally, the virtual card may have a display element (e.g., a bar code or string of numbers) which identifies the account number associated with the card. Alternatively, the virtual card may have display elements relating to the merchants that accept the card. Thus, whether the card is physical or virtual, it communicates account information.

Still referring to FIG. 2A, purchaser 200 utilizes a networked user device 206 to communicate with one or more online merchants 204 through a communications network 218 (e.g., the Internet, a secure network, etc.). The networked user device 206 may be any suitable computing device that facilitates network communications, such as, for example, a laptop computer, a tablet computer, a desktop computer, a smart television, a smart appliance, a mobile computing device, a gaming device, a wearable computing device, and so forth. When interacting with online merchant 204, networked user device 206 may be associated with a tracking element. The tracking element may be, for example, an IP address, a MAC address, a device fingerprint, a browser fingerprint, or a unique identifier associated with networked user device 206. Additionally or alternatively, the tracking element may be an identifier associated with purchaser 200. For example, in some embodiments, the tracking element may be embodied as, or otherwise include, an email address, a postal address, a phone number, a loyalty account number, a username, and/or any other unique identifier associated with purchaser 200. Through a web browser executing on networked user device 206 or through other specialized applications executing on networked user device 206 (sometimes referred to as apps), purchaser 200 may initiate purchase events with one or more of online merchants 204. Online merchant 204 may present a payment interface (e.g., a payment screen, a POS, etc.) to purchaser 200 in which information for one or more of payment vehicles 202 is entered. The payment interface can, in turn, communicate with financial transaction services processor 220 with appropriate authorization messaging. Financial transaction services processor 220 may communicate with various payment networks 230, to seek authorization for the purchase event at online merchant 204. Information based on the transaction may also be provided to a profiler computing system 222. In some embodiments, the profiler computing system 222 may be a computing system separate from the financial transaction services processor 220 and operated by a separate entity. In other embodiments, the profiler computing system 222 is a component of the financial transaction services processor 220 and operated by the same entity, as indicated by dashed box 223. The information provided to the profiler computing system 222 may be used to build a profile 226 for purchaser 200. The profile 226 may be stored in a profile data store 224. The profile data store 224 may be maintained by the profiler computing system 222, as is shown, maintained by the financial transaction services processor 220, or maintained by any other suitable device or entity, such as the data aggregator computing system 260 (FIG. 2B). The format and content of the profile 226 may vary, but generally, the profile 226 provides a linkage of the payment vehicle(s) 202 used during a purchase event to a tracking element (e.g., device ID or purchaser ID) of the networked user device 206 and/or the purchaser 200. The payment vehicle information as stored in the profile 226 may be tokenized, as may be required by relevant data privacy standards. Over time, as the purchaser 200 makes additional purchases with the same or different payment vehicles 202 using the same or different networked user devices 206, the profile 226 may be updated accordingly. Furthermore, in some embodiments, the profile 226 may utilize householding techniques to link a plurality of different purchasers to the same networked user device 206 and/or the same collection of payment vehicles 202.

Referring now to FIG. 2B, the online activity of purchaser 200 may be monitored and logged as part of the attribution techniques described herein. Using networked user device 206 (or other computing device), purchaser 200 may communicate with various web servers 250 over communications network 218. Purchaser 200 may be performing any of a variety of online activities, such as a keyword searching, visiting a merchant's ecommerce website, activating a link on a banner advertisement, activating a link resulting from a search request, and so forth. Through these interactions, purchaser 200 is generating online exposure data 252 that may be stored by a data aggregator computing system 260. The data aggregator computing system 260 may be a service provided by a third party, or the data aggregator computing system 260 may be a component of a merchant's ecommerce platform, for example. In any event, the online exposure data 252 may be linked to, or otherwise associated with, the particular tracking element or identifier (e.g., the device ID of the networked user device 206 and/or the purchaser ID of purchaser 200) and entered into a tracking profile 270. The tracking profile 270 may be maintained in a data store 268. In some embodiments, the tracking data maintained by the tracking profile 270 is time stamped. Generally, the data aggregator computing system 260 may monitor and log the interactions of purchaser 200 with various online marketing campaigns, advertisements, and so forth.

Referring now to FIG. 2C, purchaser 200 is depicted initiating a purchase event at a brick-and-mortar merchant 280 using their payment vehicle 202A. While a brick-and-mortar merchant 280 is shown in FIG. 2C, in other embodiments, the merchant 280 may be an online/ecommerce-based merchant (e.g., a brick-and-mortar retail location of one of the online merchants 204 illustratively shown in FIG. 2A). A POS of merchant 280 may provide transaction information to the financial transaction services processor 220 using conventional payment transaction communications. The financial transaction services processor 220 may then communicate with payment networks 230, as may be needed, to seek authorization for the purchase event. The financial transaction services processor 220 may also provide information from the purchase event to the profiler computing system 222. In one embodiment, the information is based on the payment vehicle 202A. In other embodiments, alternate or additional information may be provided, such as the name of purchaser 200, an email address of purchaser 200, a postal address of purchaser 200, a phone number of purchaser 200, a username of purchaser 200, and/or a loyalty card number of purchaser 200. In use, the profiler computing system 222 may query the profile data store 224 using the information provided by the financial transaction services processor 220 to determine if a tracking element (e.g., a device ID or a purchaser ID) is affiliated or otherwise associated with the information. In the illustrated embodiment, affiliation 228 between "Token A" and a "Source IP" address is identified in the profile 226.

Referring now to FIG. 2D, the profiler computing system 222 is shown providing the tracking element (e.g., the device ID or purchaser ID) to the data aggregator computing system 260 as a query. The data aggregator computing system 260 can, in turn, query the tracking profiles 270 in the data store 268 to determine if online exposure data is affiliated with that tracking element. It is to be appreciated that in some embodiments, the tracking profiles 270 may be provided to the profiler computing system 222 in real-time or batch transfers so that the affiliation between a tracking element and any online exposure data may be performed by the profiler computing system 222. In other embodiments, the tracking profiles 270 may be provided to the financial transaction services processor 220 in real-time or batch transfers so that the affiliation between a tracking element and any online exposure data may be performed by the financial transaction services processor 220. In any event, the online exposure data from the tracking profiles 270 may be provided to the profiler computing system 222 for further processing.

Figure 3:
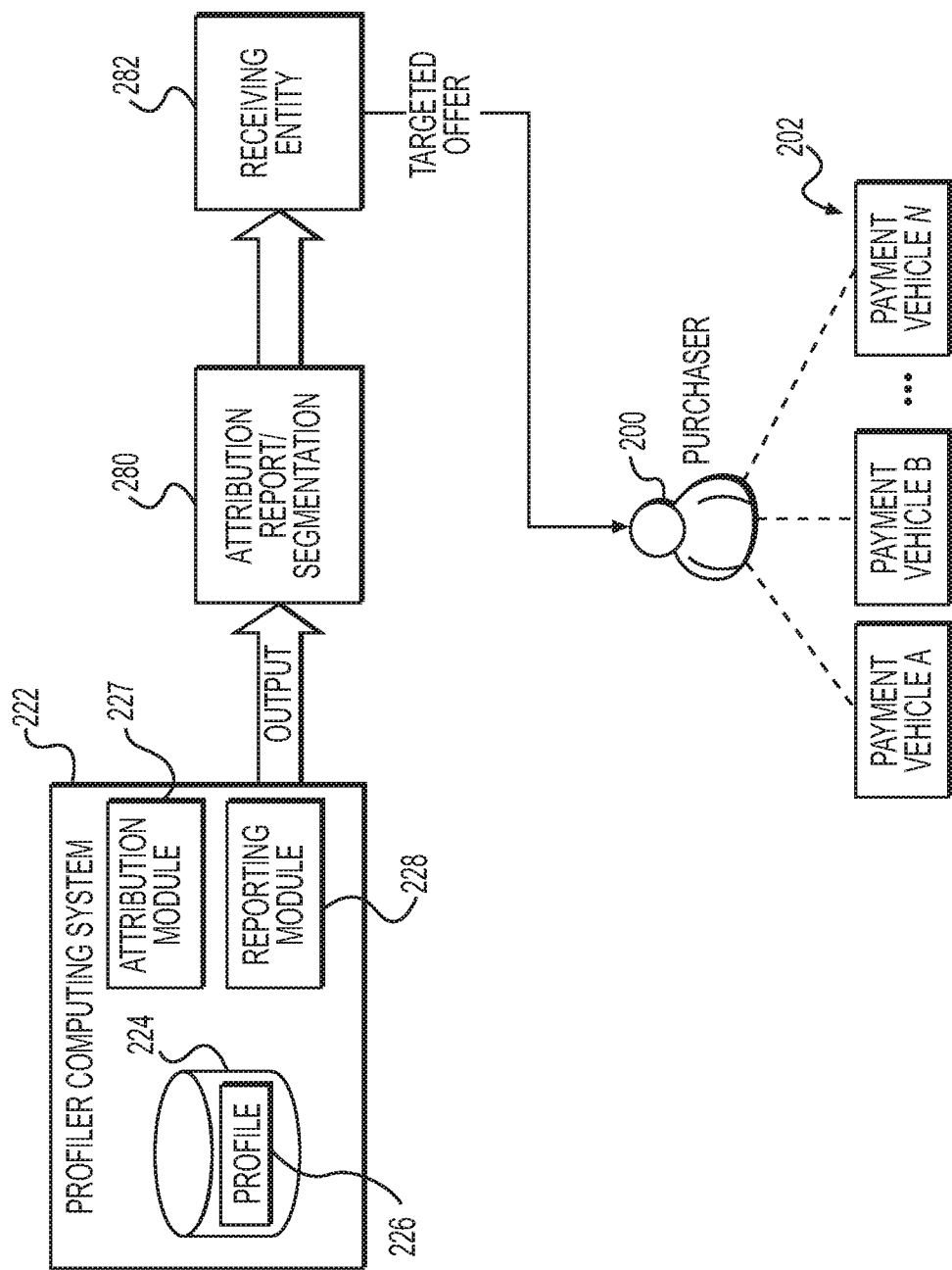
FIG. 3 depicts an example system diagram in which a receiving entity of an attribution report provides targeted offers to purchasers.

As shown in FIG. 3, an attribution module 227 of the profiler computing system 222 may map the online exposure data gathered by the data aggregator computing system 260 to the purchase event at the brick-and-mortar merchant 280 (FIG. 2C). Various rules may be applied by the attribution module 227 to determine whether to map certain online exposure data to the purchase event. Such rules may generally impact whether certain online exposure data will be linked to a subsequent purchase event. Once it is determined if a purchase event, or collection of purchase events, may be attributed to online activity of the purchaser 200, a reporting module 228 may output an attribution report 280 to a receiving entity 282. The receiving entity 282 may be, without limitation, the merchant 280, the data aggregator computing system 260, the financial transaction services processor 220, a marketing/advertisement entity, or any other interested party.

In some embodiments, the attribution report 280 may include market segmentations or other analytics, as may be useful to the receiving entity 282. Using the segmentation or other market information provided in the attribution report 280, targeted offers may be provided to purchaser 200, or a grouping of purchasers. For example, the targeted offers may be directed to purchasers who visited a particular website, purchasers who have certain types of payment vehicles, purchasers who visit particular merchants, or purchasers satisfying other segmentation parameters.

Figure 4:
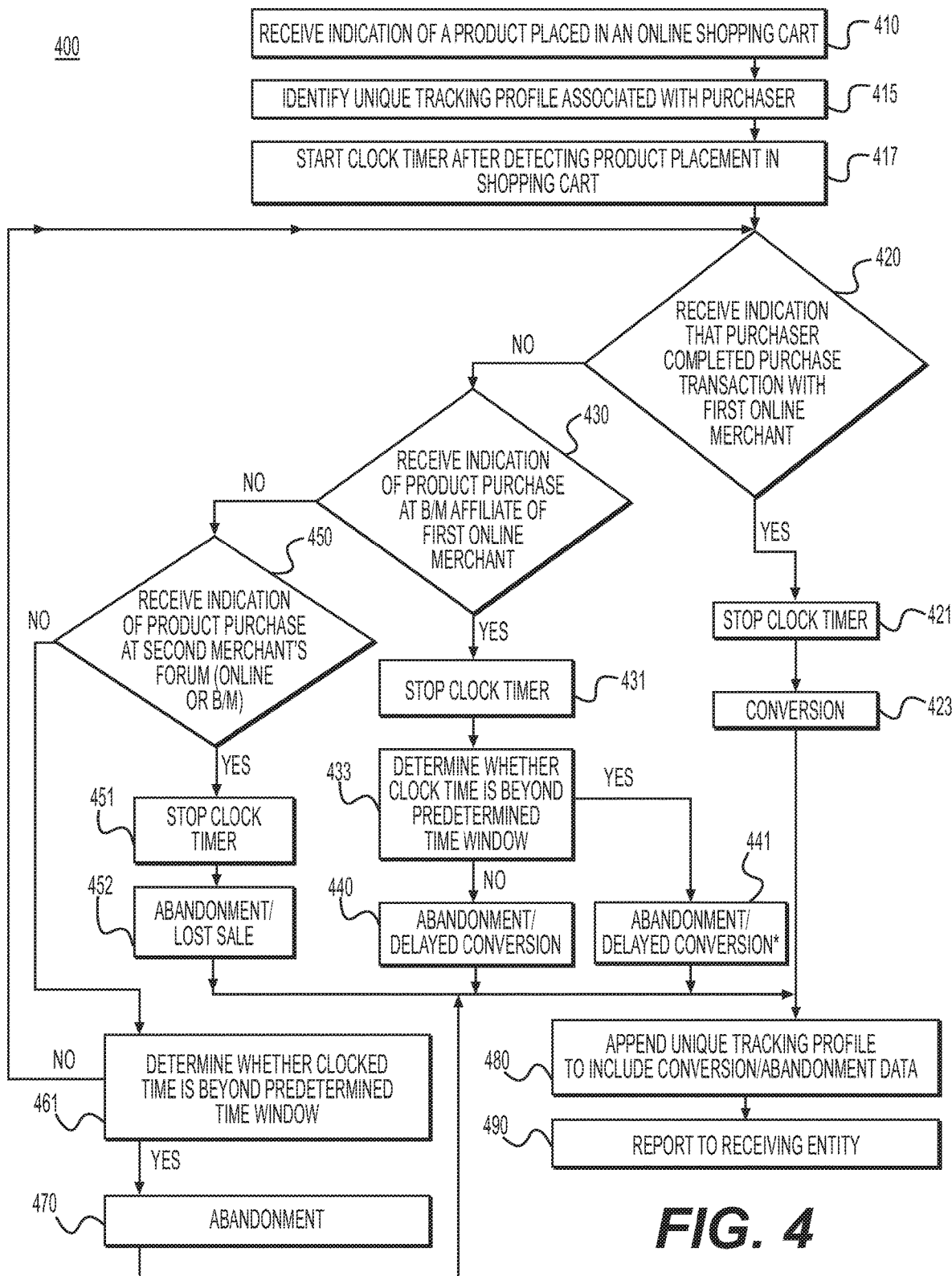
FIG. 4 is a flow chart depicting an example process for generating consumer analytics, according to one or more embodiments.

FIG. 4 is a flow chart depicting an example process 400 for generating consumer analytics for products placed in online shopping carts. As discussed with reference to FIG. 2B, a data aggregator computing system 260 may monitor and log a purchaser's interactions with online merchants, marketing campaigns, advertising, and so forth. In step 410, a data aggregator computing system 260 receives an indication that a product is placed in an online shopping cart by a purchaser. In step 415, the data aggregator computing system 260 identifies the unique tracking identifier or profile (e.g., a device ID or purchaser ID) associated with the purchaser. In step 417, a timer is initiated after detecting the product placement in the shopping cart. In some embodiments, the timer provides time stamp information for determining whether a product placed in a shopping cart is to be subsequently characterized as a conversion, delayed conversion, and/or an abandonment.

In step 420, it is determined whether the product in the shopping cart is purchased. In step 421, the data aggregator computing system 260 receives an indication that the product is purchased and stops the timer. In step 423, the product event is characterized as a successful conversion. In step 480, the data aggregator computing system 260 appends the tracking profile to include the conversion data. In step 490, the appended tracking profile is reported to a receiving entity. At step 420, if the data aggregator computing system 260 does not receive an indication that the product is purchased, then the process proceeds to step 430.

In step 430, it is determined whether the product is purchased at a brick-and-mortar (B/M) affiliate of the online merchant. In step 431, the data aggregator computing system 260 receives an indication that the product is purchased and stops the timer. In step 433, it is determined whether the clocked time is beyond a predetermined time window. In some embodiments, restrictive rules on time frames may lead to higher confidence levels in attribution. In step 440, it is determined that the clocked time is not beyond the predetermined time window and the purchase event is characterized as a product abandonment and delayed conversion. In step 441, it is instead determined that the clocked time is beyond the predetermined time window. While the purchase event may be similarly characterized as a delayed conversion, it is assigned a lower-weighted value because it may be too remote (and less relevant) to correlate to earlier interactions with online merchants. In step 480, the data aggregator computing system 260 appends the tracking profile to include the product abandonment and delayed conversion data. In step 490, the appended tracking profile is reported to a receiving entity. At step 430, if the data aggregator computing system 260 does not receive an indication that the product is purchased at a brick-and-mortar (B/M) affiliate, then the process proceeds to step 450.

In step 450, it is determined whether the product is purchased at yet a different merchant location (whether online or at a brick-and-mortar location). In some embodiments, the different merchant is a competitor and not an affiliate of the first online merchant. In step 451, the data aggregator computing system 260 receives an indication that the product is purchased at a different merchant location and stops the timer. In step 452, the purchase event is characterized as a product abandonment and a lost sale for the first online merchant. In step 480, the data aggregator computing system 260 appends the tracking profile to include the product abandonment and lost sale data. In step 490, the appended tracking profile is reported to a receiving entity.

In step 450, if the data aggregator computing system 260 does not receive an indication that the product was purchased at a different merchant location, then the process proceeds to step 461 where it is determined whether the clocked time is beyond a predetermined time window. If it is determined that the clocked time is beyond the predetermined time window, then the process proceeds to step 470 where the product is characterized as abandoned. In step 480, the data aggregator computing system 260 appends the tracking profile to include the abandonment data. In step 490, the appended tracking profile is reported to a receiving entity. At step 461, if it is determined that the clocked time is not beyond the predetermined time window, the process returns back to step 420 to determine whether the product has been purchased at the first online merchant location.

Figure 5:
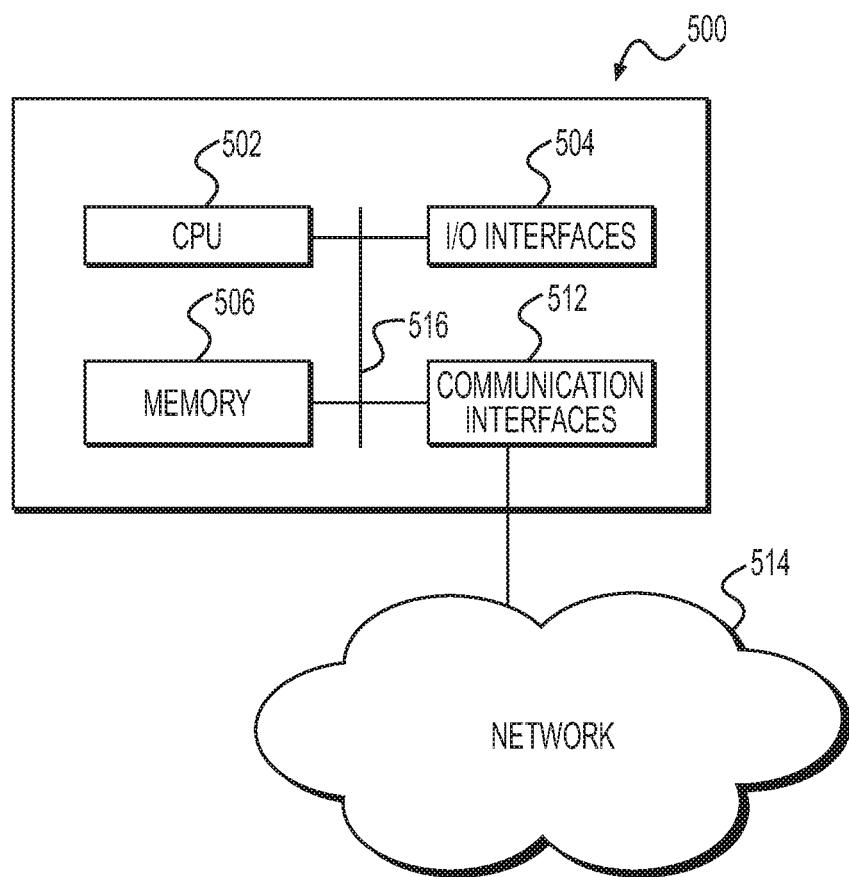
FIG. 5 is a block diagram of an example computing environment, according to one or more embodiments.

The systems and processes described above may be performed on or between one or more computing devices. FIG. 5 illustrates an example computing device. A computing device 500 may be a server, a computing device that is integrated with other systems or subsystems, a mobile computing device such as a smart phone, a cloud-based computing ability, and so forth. The computing device 500 may be any suitable computing device as would be understood in the art, including without limitation, a custom chip, and embedded processing device, a tablet computing device, a POS terminal associated with the merchant 110, a back-office system of a merchant 110, a personal data assistant (PDA), a desktop, laptop, microcomputer, and minicomputer, a server, a mainframe, or any other suitable programmable device. In various embodiments disclosed herein, a single component may be replaced by multiple components and multiple components may be replaced by single component to perform a given function or functions. Except where such substitution would not be operative, such substitution is within the intended scope of the embodiments.

The computing device 500 includes a processor 502 that may be any suitable type of processing unit, for example a general-purpose central processing unit (CPU), a reduced instruction set computer (RISC), a processor that has a pipeline or multiple processing capability including having multiple cores, a complex instruction set computer (CISC), a digital signal processor (DSP), application specific integrated circuits (ASIC), a programmable logic devices (PLD), and a field programmable gate array (FPGA), among others. The computing resources may also include distributed computing devices, cloud computing resources, and virtual computing resources in general.

The computing device 500 also includes one or more memories 506, for example read-only memory (ROM), random access memory (RAM), cache memory associated with the processor 502, or other memory such as dynamic RAM (DRAM), static RAM (SRAM), programmable ROM (PROM), electrically erasable PROM (EEPROM), flash memory, a removable memory card or disc, a solid-state drive, and so forth. The computing device 500 also includes storage media such as a storage device that may be configured to have multiple modules, such as magnetic disk drives, floppy drives, tape drives, hard drives, optical drives and media, magneto-optical drives and media, compact disk drives, Compact Disc Read Only Memory (CD-ROM), compact disc recordable (CD-R), Compact Disk Rewritable (CD-RW), a suitable type of Digital Versatile Disc (DVD) or BluRay disc, and so forth. Storage media such as flash drives, solid-state hard drives, redundant array of individual discs (RAID), virtual drives, networked drives and other memory means including storage media on the processor 502, or memories 506 are also contemplated as storage devices. It may be appreciated that such memory may be internal or external with respect to operation of the disclosed embodiments. It may be appreciated that certain portions of the processes described herein may be performed using instructions stored on a computer readable medium or media that direct computer system to perform the process steps. Non-transitory computable-readable media, as used herein, comprises all computer-readable media except for transitory, propagating signals.

Networking communication interfaces 508 may be configured to transmit to, or receive data from, other computing devices 500 across a network 512. The network and communication interfaces 508 may be an Ethernet interface, a radio interface, a Universal Serial Bus (USB) interface, or any other suitable communications interface and may include receivers, transmitter, and transceivers. For purposes of clarity, a transceiver may be referred to as a receiver or a transmitter when referring to only the input or only the output functionality of the transceiver. Example communication interfaces 508 may include wire data transmission links such as Ethernet and TCP/IP. The communication interfaces 508 may include wireless protocols for interfacing with private or public networks 512. For example, the network and communication interfaces 508 and protocols may include interfaces for communicating with private wireless networks such as Wi-Fi network, one of the IEEE 802.11x family of networks, or another suitable wireless network. The network and communication interfaces 508 may include interfaces and protocols for communicating with public wireless networks 508, using for example wireless protocols used by cellular network providers, including Code Division Multiple Access (CDMA) and Global System for Mobile Communications (GSM). A computing device 500 may use network and communication interfaces 508 to communicate with hardware modules such as a database or data store, or one or more servers or other networked computing resources. Data may be encrypted or protected from unauthorized access.

In various configurations, the computing device 500 may include a system bus 510 for interconnecting the various components of the computing device 500, or the computing device 500 may be integrated into one or more chips such as programmable logic device or application specific integrated circuit (ASIC). The system bus 510 may include a memory controller, a local bus, or a peripheral bus for supporting input and output devices 504, and communication interfaces 508. Example input and output devices 504 include keyboards, keypads, gesture or graphical input devices, motion input devices, touchscreen interfaces, one or more displays, audio units, voice recognition units, vibratory devices, computer mice, and any other suitable user interface.

The processor 502 and memory 506 may include non-volatile memory for storing computable-readable instructions, data, data structures, program modules, code, microcode, and other software components for storing the computer-readable instructions in non-transitory computable-readable mediums in connection with the other hardware components for carrying out the methodologies described herein. Software components may include source code, compiled code, interpreted code, executable code, static code, dynamic code, encrypted code, or any other suitable type of code or computer instructions implemented using any suitable high-level, low-level, object-oriented, visual, compiled, or interpreted programming language.

These and other embodiments of the systems and methods may be used as would be recognized by those skilled in the art. The above descriptions of various systems and methods are intended to illustrate specific examples and describe certain ways of making and using the systems disclosed and described here. These descriptions are neither intended to be nor should be taken as an exhaustive list of the possible ways in which these systems may be made and used. A number of modifications, including substitutions of systems between or among examples and variations among combinations may be made. Those modifications and variations should be apparent to those of ordinary skill in this area after having read this disclosure.

It is intended that the specification and examples be considered as exemplary only, with a true scope and spirit of the invention being indicated by the following claims.

What is claimed is:

1. A computer-implemented method of generating consumer analytics for products placed in online shopping carts using a profiler computing system, the method comprising:
   receiving, by one or more processors of the profiler computing system and from a user device in electronic communication with the profiler computing system over an electronic network and via a tracking identifier associated with the user device, a first time value and a first product identifier associated with a first product being added, by a user using the user device, to an online shopping cart of a first merchant system, wherein the tracking identifier associated with the user device is one of a primary account number (PAN), a device identification (ID), or an email address;
   receiving, by the one or more processors, a second time value and a second product identifier associated with a purchase transaction associated with a second product purchased by the user;
   determining, by the one or more processors, that the first product identifier and the second product identifier identify matching products;
   determining, by the one or more processors, a time difference between the first time value and the second time value;
   updating, by the one or more processors, a unique tracking profile of the user stored by the profiler computing system to include a characterization of a purchase event based on the time difference; and
   transmitting, by the one or more processors and to a receiving entity user device, the unique tracking profile.

2. The computer-implemented method of claim 1, further comprising:
   comparing, by the one or more processors, the time difference to a predetermined period of time to determine that the time difference is less than the predetermined period of time or greater than the predetermined period of time; and
   determining, by the one or more processors, the characterization of the purchase event based on the comparing.

3. The computer-implemented method of claim 1, wherein determining that the first product identifier and the second product identifier identify matching products further includes:
   determining, by the one or more processors, a first matching characteristic of the first product and a second matching characteristic of the second product, the first matching characteristic and the second matching characteristic based on one or more of: a model number, a part number, a stock keeping unit (SKU), and an international standard book number (ISBN) of the first product and the second product, respectively.

4. The computer-implemented method of claim 1, further comprising:
   receiving, by the one or more processors, an indication that the user completed the purchase transaction associated with the second product using a second merchant system; and
   determining, by the one or more processors, the characterization of the purchase event based on the indication.

5. The computer-implemented method of claim 4, wherein the second merchant system is associated with one of an online store or a brick-and-mortar store.

6. A profiler computing system for generating consumer analytics for products placed in online shopping carts, the system comprising:
   a data storage device storing instructions for generating the consumer analytics for the products placed in the online shopping carts; and
   one or more processors configured to execute the instructions that, when executed by the one or more processors, cause the one or more processors to perform operations comprising:
      receiving, by one or more processors of the profiler computing system and from a user device in electronic communication with the profiler computing system over an electronic network and via a tracking identifier associated with the user device, a first time value and a first product identifier associated with a first product being added, by a user using the user device, to an online shopping cart of a first merchant system, wherein the tracking identifier associated with the user device is one of a primary account number (PAN), a device identification (ID), or an email address;
      receiving, by the one or more processors, a second time value and a second product identifier associated with a purchase transaction associated with a second product purchased by the user;
      determining, by the one or more processors, that the first product identifier and the second product identifier identify matching products;
      determining, by the one or more processors, a time difference between the first time value and the second time value;
      updating, by the one or more processors, a unique tracking profile of the user stored by the profiler computing system to include a characterization of a purchase event based on the time difference; and transmitting, by the one or more processors and to a receiving entity user device, the unique tracking profile.

7. The profiler computing system of claim 6, wherein the operations further comprise:

comparing, by the one or more processors, the time difference to a predetermined period of time to determine that the time difference is less than the predetermined period of time or greater than the predetermined period of time; and determining, by the one or more processors, the characterization of the purchase event based on the comparing.

8. The profiler computing system of claim 6, wherein the operations further comprise:

receiving, by the one or more processors, an indication that the user completed the purchase transaction associated with the second product using a second merchant system; and determining, by the one or more processors, the characterization of the purchase event based on the indication.

9. The profiler computing system of claim 8, wherein the second merchant system is associated with one of an online store or a brick-and-mortar store.

10. A non-transitory computer readable medium for generating consumer analytics for products placed in online shopping carts, the non-transitory computer readable medium storing instructions that, when executed by one or more processors of a profiler computing system, cause the one or more processors to perform operations comprising:

receiving, by one or more processors of the profiler computing system and from a user device in electronic communication with the profiler computing system over an electronic network and via a tracking identifier associated with the user device, a first time value and a first product identifier associated with a first product being added, by a user using the user device, to an online shopping cart of a first merchant system, wherein the tracking identifier associated with the user device is one of a primary account number (PAN), a device identification (ID), or an email address;

receiving, by the one or more processors, a second time value and a second product identifier associated with a purchase transaction associated with a second product purchased by the user;

determining, by the one or more processors, that the first product identifier and the second product identifier identify matching products;

determining, by the one or more processors, a time difference between the first time value and the second time value;

updating, by the one or more processors, a unique tracking profile of the user stored by the profiler computing system to include a characterization of a purchase event based on the time difference; and transmitting, by the one or more processors and to a receiving entity user device, the unique tracking profile.

11. The non-transitory computer readable medium of claim 10, wherein the operations further comprise:

comparing, by the one or more processors, the time difference to a predetermined period of time to determine that the time difference is less than the predetermined period of time or greater than the predetermined period of time; and determining, by the one or more processors, the characterization of the purchase event based on the comparing.

12. The non-transitory computer readable medium of claim 10, wherein determining that the first product identifier and the second product identifier identify matching products further includes:

determining, by the one or more processors, a matching characteristic, the matching characteristic based on one or more of: a model number, a manufacturer part number, a stock keeping unit (SKU), and an international standard book number (ISBN).

13. The non-transitory computer readable medium of claim 10, wherein the operations further comprise:

receiving, by the one or more processors, an indication that the user completed the purchase transaction associated with the second product using a second merchant system; and determining, by the one or more processors, the characterization of the purchase event based on the indication.

14. The non-transitory computer readable medium of claim 13, wherein the second merchant system is associated with one of an online store or a brick-and-mortar store.

* * * * *